United States Patent
Casey et al.

(10) Patent No.: US 12,488,471 B2
(45) Date of Patent: Dec. 2, 2025

(54) IDENTIFYING DATA IN A NUMBER OF IMAGES TO TRANSFORM WITH IDENTIFICATION OF A BLANK AND COLORED PORTIONS

(71) Applicant: Micron Technology, Inc., Boise, ID (US)

(72) Inventors: Barbara L Casey, Star, ID (US); Madison E Wale, Boise, ID (US); Sri Divya Deenadayalan, Boise, ID (US); Surabhi Anurag, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 578 days.

(21) Appl. No.: 17/580,107

(22) Filed: Jan. 20, 2022

(65) Prior Publication Data

US 2023/0206461 A1    Jun. 29, 2023

Related U.S. Application Data

(60) Provisional application No. 63/294,525, filed on Dec. 29, 2021.

(51) Int. Cl.
*G06T 7/168* (2017.01)
*G06T 7/90* (2017.01)
*G06V 10/56* (2022.01)

(52) U.S. Cl.
CPC ............... *G06T 7/168* (2017.01); *G06T 7/90* (2017.01); *G06V 10/56* (2022.01)

(58) Field of Classification Search
CPC ........... G06T 7/168; G06T 7/90; G06V 10/56; G06V 30/41; G06V 30/1801
See application file for complete search history.

(56) References Cited

U.S. PATENT DOCUMENTS

| | | | |
|---|---|---|---|
| 5,933,994 A * | 8/1999 | Misaresh | G09F 3/20 40/661 |
| 9,729,787 B2 | 8/2017 | Shechtman et al. | |
| 10,373,583 B2 | 8/2019 | Borenstein et al. | |
| 2006/0280360 A1* | 12/2006 | Holub | G01J 3/0291 382/162 |
| 2014/0210847 A1 | 7/2014 | Knibbeler et al. | |
| 2019/0156526 A1* | 5/2019 | Liu | G16H 30/40 |
| 2019/0279402 A1* | 9/2019 | Panetta | G06T 7/10 |
| 2019/0362478 A1* | 11/2019 | Nanda | G06T 7/90 |
| 2021/0321038 A1* | 10/2021 | Raproeger | G06T 7/55 |
| 2022/0019849 A1* | 1/2022 | Kim | G06N 3/08 |

(Continued)

OTHER PUBLICATIONS

GSMARENA, Apple iphone 11 Pro, Sep. 18, 2019 https://web.archive.org/web/20190918024606/https://www.gsmarena.com/apple_iphone_11_pro-9847.php, p. 1 (Year: 2019).*

*Primary Examiner* — Michael P LaPage
(74) *Attorney, Agent, or Firm* — Brooks, Cameron & Huebsch, PLLC

(57) ABSTRACT

Methods, devices, and systems associated with identifying data to transform are described. A method can include receiving, at a model stored on a computing device, data comprising a number of images, receiving, at the model, an input from a user, identifying, via the model, a number of attributes based on the input from the user, and identifying, via the model, a portion of an image of the number of images including at least one of the number of attributes to transform.

7 Claims, 5 Drawing Sheets

(56) References Cited

U.S. PATENT DOCUMENTS

2022/0051451 A1* 2/2022 Gao .......................... G06T 7/90
2022/0076590 A1* 3/2022 Beerana ................ G06T 11/001
2022/0188999 A1* 6/2022 Wang ..................... G06T 7/162

* cited by examiner

IDENTIFYING DATA IN A NUMBER OF IMAGES TO TRANSFORM WITH IDENTIFICATION OF A BLANK AND COLORED PORTIONS

PRIORITY INFORMATION

This application claims the benefit of U.S. Provisional Application No. 63/294,525, filed Dec. 29, 2021, the contents of which are incorporated herein by reference.

TECHNICAL FIELD

The present disclosure relates generally to apparatuses, systems, and methods associated with identifying data to transform.

BACKGROUND

A computing device can be a smartphone, a wearable device, a tablet, a laptop, a desktop computer, a smart assistant device, or a cloud computing device, for example. The computing device can receive and/or transmit data and can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

Figure 1:
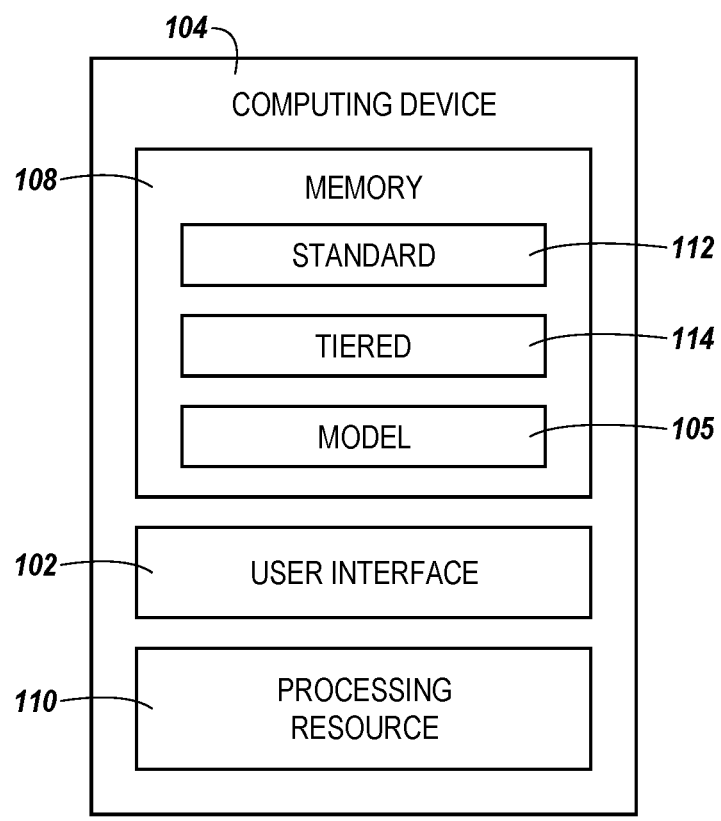
FIG. 1 illustrates an example of a computing device for identifying data to transform in accordance with a number of embodiments of the present disclosure.

Methods, devices, and systems associated with identifying data to transform are described herein. A method can include receiving, at a model stored on a computing device, data comprising a number of images, receiving, at the model, an input from a user, identifying, via the model, a number of attributes based on the input from the user, and identifying, via the model, a portion of an image of the number of images including at least one of the number of attributes to transform. Attributes can include a resolution, a pixel color, a pixel quality, a color contrast, and/or a type of an image, for example.

Sensors and/or computing devices can produce data frequently and/or in large quantities. Some or all of this data may need to be modified to be useful. For example, the data including the number of images can be improperly suited for a particular use. Determining which data to transform and store from large data sets can be tedious and can slow down a transformation process. In a number of embodiments, a model can determine whether an image is improperly suited for its intended use and select that image for transformation. The model can save time and/or power by reducing and/or eliminating external communications when determining which data to transform.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "P", "X", "Y", and/or "Z", particularly with respect to reference numerals in the drawings, indicate that a number of the particular feature can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of" "at least one," and "one or more" (e.g., a number of sensors) can refer to one or more sensors, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 104 can reference element "04" in FIG. 1, and a similar element can be referenced as 204 in FIG. 2. A group or plurality of similar elements or components can generally be referred to herein with a single element number. For example, a plurality of reference elements 230-1, ..., 230-X (e.g., 230-1 to 230-X) can be referred to generally as 230. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 illustrates an example of a computing device 104 for identifying data to transform in accordance with a number of embodiments of the present disclosure. The computing device 104 can be, for example, a personal laptop computer, a desktop computer, a cloud computing device, a tablet, a mobile telephone, a server, and/or an internet-of-things (IoT) enabled device. A memory resource 108 (e.g., memory), a user interface 102, and/or a processing resource 110 (e.g., processor) can be included in and/or coupled to computing device 104. The memory 108 can include standard memory 112 (e.g., NAND) and/or tiered memory 114 (e.g., DRAM) and can store a model 105.

The memory 108 can be any type of storage medium that can be accessed by the processor 110 to perform various examples of the present disclosure. For example, the memory 108 can be a non-transitory computer readable medium having computer readable instructions (e.g., computer program instructions) stored thereon that are executable by the processor 110 to receive, at the model 105 stored on the computing device 104, data comprising a number of images, receive, at the model 105, an input from a user, identify, via the model 105, a number of attributes based on the input from the user, and identify, via the model 105, a portion of an image of the number of images including at least one of the number of attributes.

The processor 110 can include components configured to enable the computing device 104 to perform artificial intelligence (AI) operations. In some examples, AI operations may include operations, training operations, and/or interference operations. In a number of embodiments, model 105 can be an AI model. Model 105 can be trained on computing device 104 and/or trained remotely in a cloud using sample data and transmitted to the computing device 104.

Figure 2:
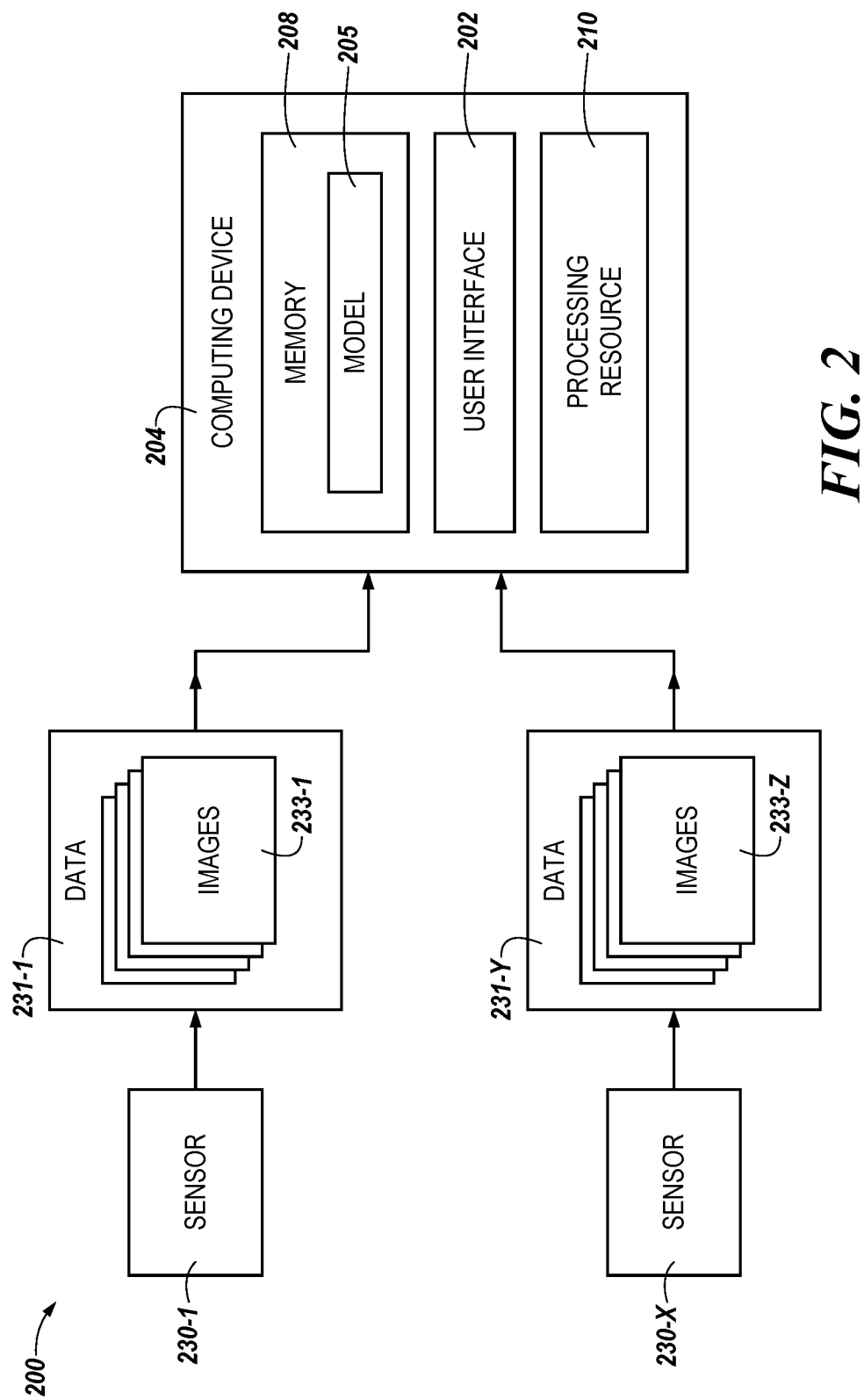
FIG. 2 is an example of a system including a computing device for identifying data to transform in accordance with a number of embodiments of the present disclosure.

The model 105 can receive data from a number of sensors (e.g., sensors 230-1, . . . , 230-X in FIG. 2). For example, the computing device 104 can receive data including images and/or videos from a number of cameras (e.g., image sensors). In some examples, the model 105 can receive data from the computing device 104. For example, the computing device 104 can transmit data including a screen shot of an image, a document, and/or file to model 105.

In a number of embodiments, the model 105 can receive an input from a user. The input can include an image, a portion of an image, a pixel color range, a type of data, a source of data, a resolution threshold, a pixel quality threshold, a contrast threshold, and/or a lighting range. The user can enter the input as text, a selection, and/or an attachment, for example.

The input can be received via the user interface 102. The user interface 102 can be generated by computing device 104 in response to one or more commands. The user interface 102 can be a graphical user interface (GUI) that can provide and/or receive information to and/or from the user of the computing device 104. In a number of embodiments, the user interface 102 can be shown on a display of the computing device 104.

The model 105 can identify a number of attributes based on the input from the user. For example, if the input is a particular pixel color range, the model 105 can identify a portion of an image and/or an image having a pixel in the particular pixel color range. In a non-limiting example, a user can provide input by selecting one or more images of the number of images received which include one or more pixels within a particular color range to transform and/or by refraining from selecting one or more images of the number of images received which do not have one or more pixels within the particular color range. Accordingly, the model 105 can learn to select images including pixels within the particular color range to transform.

In some examples, the model 105 can generate a setting to select images for transformation. The model 105 can generate settings based on a pixel color range, a type of data, a source of data, a resolution threshold, a pixel quality threshold, a contrast threshold, and/or a lighting range. In some examples, the setting can determine which image to transform, which pixels of an image to transform, and the type of transformation to be performed on an image. The model 105 can generate the setting based on input from a user. The settings can be used to identify images for transformation. For example, the model 105 can identify attributes within images based on the settings. For instance, the setting can cause images including pixels within a particular color range to be selected by the model 105. The model 105 can identify attributes within an image with the particular color range based on the setting and select the image for transformation.

In some examples, a prompt to accept or reject the setting can be displayed on the user interface 102. The user can provide feedback by accepting or rejecting the setting via the user interface 102. If accepted, the model 105 can apply the particular color range setting to additional data received by the computing device 104. For example, the model 105 can receive an additional number of images and select one or more images of the additional number of images including pixels within the particular color range. The examples herein can describe prompting a user to accept a setting before applying the setting to additional data. However, it is to be understood that the model 105 can apply the generated setting to additional data without prompting and/or acceptance from a user.

In another non-limiting example, a user can provide an input that generates a setting to select an image when the color contrast of the image is below a threshold color contrast level. The model 105 can select images based on the generated setting. For example, the model 105 can identify a number of attributes of each of a number of images. If an image of the number of images includes an attribute of a color contrast level below the threshold, the model 105 can select the image to transform.

In some examples, a user can provide input to the model 105 by selecting an image with dark lighting and/or light lighting (e.g., a lighting attribute) for transformation. The model 105 can generate a setting that includes an image lighting range and/or an image lighting threshold (e.g., a lighting setting) and prompt the user to either accept or reject the setting. If accepted, the model 105 can apply the lighting setting to additional data. For example, the model 105 can be trained to select images outside of a particular light range based on the selections made by the user.

In response to an image being outside the particular light range, the image can be selected by the model 105 to be transformed. In some examples, the model 105 can select the type of transformation based on user inputs and/or previous transformations performed on images with similar attributes. For example, since the image was selected in response to the image being outside the particular light range, the model 105 can determine the transformation should lighten or darken the image depending on whether the light of the image is below or above the particular light range.

The model 105 can be configured to apply one or more settings to incoming data. For example, the model 105 can apply a color contrast setting and/or color range setting to data including a number of images. In some embodiments, the model 105 can apply both settings to one or more of the number of images included in the data and select one or more images for transformation based on the settings.

Once data is transformed, the model 105 can determine where the transformed data is stored. The model 105 can determine what type of memory to store the transformed data in based on the input from the user, the number of images received, and/or the type of transformation performed, for example. The model 105 can generate a setting that determines the storage location and/or prompts the user to either accept or reject the setting. If accepted, the model 105 can apply the storage location setting to additional data received by the computing device 104.

The types of memory can include tiered memory 114 for content that requires more memory and processing load and standard memory 112 for content that requires less memory and processing load. For example, the model 105 may identify only a portion of an image for transformation. In response to determining the portion of the image for transformation, the model 105 may determine to store the portion of the image in tiered memory 114 to provide more memory and processing load for performing the transformation. Since the rest of the image is not being transformed, the model 105 can determine to store the rest of the image in standard memory 112. Once the portion of the image is transformed, the portion of the image can be stored with the rest of the image in standard memory 112.

In some examples, a first portion of data may be stored in tiered memory 114 in response to the model 105 determining a first type of transformation to be performed on the first portion of data that requires more memory and processing load to perform and a second portion of data may be stored in standard memory 112 in response to the model 105 determining a second type of transformation to be performed on the second portion of data that requires less memory and processing load to perform. However, this disclosure is not so limited. In some embodiments, the model 105 may identify a portion of an image for transformation and store the portion of the image in tiered memory 114. In addition, the model 105 can transfer the entire image to standard memory 112 after the transformation.

In some examples, a user can provide subsequent input about an image transformation after an image and/or a portion of an image is transformed. The subsequent input from the user can assist the model 105 in transforming images and/or portion of images based on user preferences. For example, based on the preference of the user, the model 105 can be updated to identify images and/or portions of images for transformation. For instance, a user can make changes to a transformed image and/or a portion of a transformed image to provide the model 105 with a better understanding of the user preference. The updated model 105 can then identify images and/or portions of images for transformation based on the subsequent input. In contrast, the model 105 can refrain from being updated based on the subsequent input provided by the user. That is, the subsequent input can confirm the transformed image and/or portion of the image matches a user preference. For example, the model 105 can prompt the user to confirm a transformed image and/or portion of the image after a transformation has occurred. If the user confirms the transformation of the image and/or portion of the image, the model 105 can refrain from being updated. Similarly, the user can make no changes to a transformed image and/or portion of the image to confirm the transformation of the image and/or portion of the image. If the user makes no changes to the transformed image and/or portion of the image, the model 105 can remain in its current state and refrain from being updated, since the current state of the model 105 is in line with the preference of the user.

FIG. 2 is an example of a system 200 including a computing device 204 for identifying data to transform in accordance with a number of embodiments of the present disclosure. The number of sensors 230-1, . . . , 230-X can be coupled to the computing device 204. The sensors 230-1, . . . , 230-X can be communicatively coupled to the computing device 204 via a physical connection (e.g., via wiring, circuitry, etc.) or remotely coupled (e.g., via a wireless signal, near field communication, Bluetooth, Bluetooth Low Energy, RFID, etc.). The sensors 230-1, . . . , 230-X can be communicatively coupled to the model 205 via computing device 204.

The sensors 230-1, . . . , 230-X can be the same type or different types of sensors. For example, both sensors 230-1, . . . , 230-X can be image sensors (e.g., cameras) or sensor 230-1 can be a visible light camera and sensor 230-X can be an infrared (IR) camera. In a number of embodiments, the sensors 230-1, . . . , 230-X can be an acoustic sensor, a proximity sensor, and/or any other type of sensor and can provide data other than images. Sensors 230-1, . . . , 230-X can be collectively referred to as sensor 230.

Although FIG. 2 illustrates a number of sensors 230-1, . . . , 230-X coupled to the computing device 204, a number of other devices can be coupled to instead of or in unison with the number of sensors 230-1, . . . , 230-X. For example, computing device 204 can be coupled to and/or receive data 231-1 and/or data 231-Y from another computing device. Data 231-1 and/or data 231-Y can include an image, a video, a screen recording, and/or a screenshot generated or received by another computing device and transmitted to computing device 204. Data 231-1, . . . , 231-Y can be collectively referred to as data 231.

The embodiment shown in FIG. 2 illustrates an example of image sensors 230-1 and 230-X transmitting first data 231-1 including one or more images 233-1 and second data 231-Y including one or more images 233-Z to the computing device 204. The computing device 204 can include a user interface 202, a processing resource 210, and a memory 208 including model 205. Computing device 204, user interface 202, processing resource 210, memory 208, and/or model 205 can correspond to computing device 104, user interface 102, processing resource 110, memory 108, and/or model 105, respectively in FIG. 1.

The model 205 can receive the data 231-1 and/or the data 231-Y and identify one or more attributes in the data 231-1 and/or 231-Y. For example, the model 205 can identify one or more attributes of the number of images 233-1 included in data 231-1 and/or the number of images 233-Z included in data 231-Y including the resolution of each of the number of images 233-1, . . . , 233-Z, the pixel quality of each of the number of images 233-1, . . . , 233-Z, the pixel color range of each of the number of images 233-1, . . . , 233-Z, the color contrast of each of the number of images 233-1, . . . , 233-Z, the lighting of each of the number of images 233-1, . . . , 233-Z, among other attributes of each of the number of images 233-1, . . . , 233-Z. Images 233-1, . . . , 233-Z can be collectively referred to as images 233.

In some embodiments, the computing device 204 can include a display that can present data 231-1 and/or data 231-Y to a user via user interface 202. For example, the user interface 202 can display data 321-1 and/or data 231-Y in response to the computing device 204 receiving data 231-1 and/or data 231-Y. An input can be received from a user via user interface 202. The model 205 can generate a setting based on the input from the user, as previously described in connection with FIG. 1.

The model 205 may generate a setting to select data 231-1 and/or 231-Y based on a type of sensor 230-1, type of sensor 230-X, characteristics of sensor 230-1 generating data 231-1 and/or characteristics of sensor 230-X generating data 231-Y. In some examples, the model 204 may select images 233-1 from sensor 230-1 for a first type of transformation and select images 233-Y from sensor 230-X for a second type of transformation. For example, sensor 230-1 may capture images 233-1 with poor pixel quality, which makes the images 233-1 appear out of focus and/or blurry. The user may select these images 233-1 for transformation as an input. In response to the user selecting these images 233-1, the model 205 can generate a setting to select images 233-1 from sensor 230-1 for transformation.

The model 205 can generate a number of settings based on a number of inputs from the user. For example, the model 205 may generate another setting to transform data 231 using a particular type of transformation based on a type of sensor 230-1, type of sensor 230-X, characteristics of sensor 230-1 and/or characteristics of sensor 230-X. Transformation types can include a lighten transformation, a darken transformation, a resolution transformation, a sharpen transformation, a color contrast transformation, and/or a color range transformation, for example. The user may input a command to use a sharpen transformation on images 233-1. In response to the input, the model 205 can generate a setting to transform images 233-1 from sensor 230-1 using a sharpen transformation.

In a number of embodiments, the model 205 can generate a setting based on the type of image 233-1 and/or 233-Z. The type of image 233-1 and/or 233-Z can be a portrait or a landscape, for example. Data 231-1 can include settings of sensor 230-1 and data 231-Y can include settings of sensor 230-X. For example, sensor 230-1 can be on a portrait setting and/or sensor 230-X can be on a landscape setting. The model 205 can select a particular transformation for the number of images 233-1 taken by sensor 230-1 on a portrait setting and select a different transformation for the number of images 233-Z taken by sensor 230-X on a landscape setting.

In some examples, the type of images 223-1 and/or 233-Z can be determined by their content. Content can include objects, animals, people, and/or locations. For example, the model 205 can determine images 233-1 were taken outdoors in response to the images 233-1 including a lake and images 233-Z were taken indoors in response to the images 233-Z including a couch. In response to the model 205 determining images 233-1 were taken outdoors, the model 205 can select a transformation to darken images 233-1 and/or in response to the model 205 determining images 233-Z were taken indoors, the model 205 can select a transformation to lighten images 233-Z.

Figure 3:
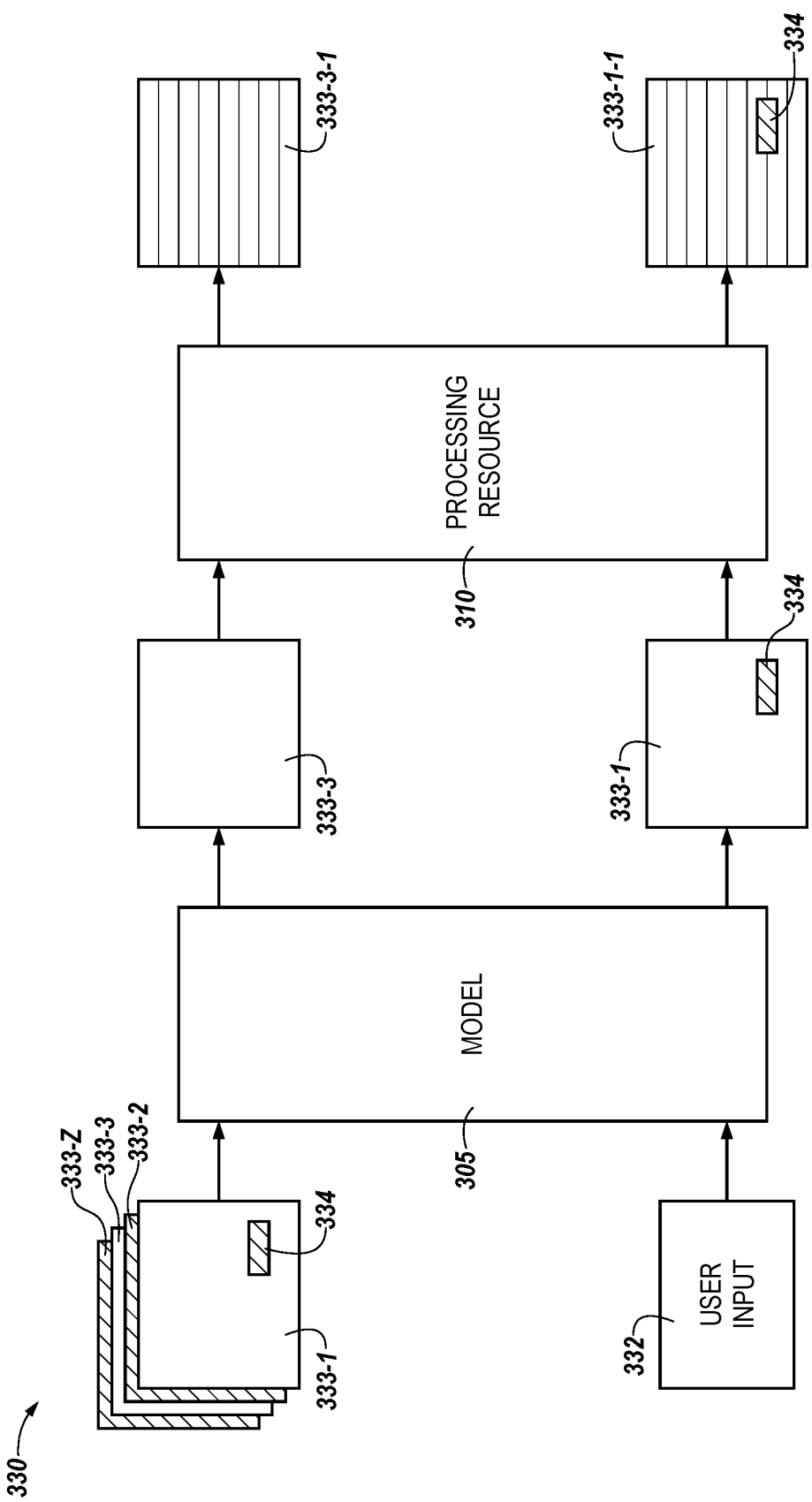
FIG. 3 is an example of a flow diagram for identifying and transforming a number of images in accordance with a number of embodiments of the present disclosure.

FIG. 3 is an example flow diagram 330 for identifying and transforming a number of images 333-1, 333-2, 333-3, 333-Z in accordance with a number of embodiments of the present disclosure. Images 333-1, 333-2, 333-3, and 333-Z can collectively be referred to as images 333. The number of images 333-1, . . . , 333-Z can correspond to the number of images 233-1, . . . , 233-Z in FIG. 2. The number of images 333-1, . . . , 333-Z can be received at model 305.

Model 305 can correspond to model 105 in FIG. 1 and/or model 205 in FIG. 2. The model 305 can receive the number of images 333-1, . . . , 333-Z and/or user input 332. The images 333-1, . . . , 333-Z can be video images, still images, etc. The user input 332 can include an image, a portion of an image, a pixel color range, a type of data, a source of data, a resolution threshold, a pixel quality threshold, a contrast threshold, and/or a lighting range, for example.

The model 305 can identify a number of attributes based on the user input 332. For example, the user input 332 can include transforming blank portions (e.g., pixels with a white color value) of one or more of the number of images 333-1, . . . , 333-Z to horizontal lines. Accordingly, the model 305 can identify blank portions as the attribute and adding horizontal lines as the transformation based on the user input 332.

In some embodiment, as illustrated in FIG. 3, the model 305 can tag image 333-1 and image 333-3, which both contain blank portions. A tag can identify an image for transformation and include a type of transformation to be performed on the particular image and/or a particular portion of an image to be transformed. For example, the model 305 can tag image 333-3, the tag can include information to transform the entire image 333-3 to horizontal lines. Similarly, the model can tag image 333-1, the tag can include information to transform the blank portion of image 333-1 to horizontal lines and leave the portion 334 of image 333-1 including diagonal lines alone.

Image 333-1 and image 333-3 can be transmitted to a processing resource 310, which can correspond to processing resource 110 in FIG. 1 and/or processing resource 210 in FIG. 2, for transformation. In some examples, the processing resource 310 may only receive portions of the number of images 333-1, . . . , 333-Z that are to be transformed. For example, the processing resource 310 can receive the entire image 333-3 since the entire image 333-3 is to be transformed and the blank portion of image 333-1. That is, the processing resource 310 may not receive portion 334 of image 333-1 if it is not tagged for transformation. The processing resource 310 can transform image 333-1 and image 333-3 based on their respective tags. As illustrated in FIG. 3, image 333-3 can be transformed to image 333-3-1 including horizontal lines and image 333-1 can be transformed to image 333-1-1 including horizontal lines and original portion 334.

In another embodiment, the model 305 can receive images 333-1, . . . 333-Z. Based on a setting generated by the model 305, the model 305 can identify attributes of the received images 333-1, . . . , 333-Z. The setting can cause the model 305 to identify a specific characteristic of the received images 333-1, . . . , 333-Z. For example, the setting can cause the model 305 to identify portions of the images 333-1, . . . , 333-Z that include red, which can be illustrated as diagonal lines in FIG. 3, for transformation. The model 305 can transmit and/or store the images 333-1, 333-2, and 333-Z including red for transformation and refrain from transmitting and/or storing image 333-3 which does not include red portions.

In some embodiments, the model 305 can tag each of the number of images 333-1, 333-2, and 333-Z identified for transformation before sending the images 333-1, 333-2, and 333-Z to the processing resource 310 for transformation. For example, the model 305 can tag the portions of the images 333-1, 333-2, and 333-Z that are to be transformed. That is, the model 305 can tag the images 333-1, 333-2, and 333-Z, that are to be transformed, by identifying each pixel that is to be transformed of the number of images 333-1, 333-2, and 333-Z and the type of transformation that each pixel should undergo. For example, the model 305 can tag each red pixel that is to be transformed from red to yellow. In some examples, the model 305 can identify the entire image for transformation. For example, images 333-2 and 333-Z can be completely red, as such, the model 305 can tag both entire images 333-2 and 333-Z for transformation. In another example, the model 305 can identify a portion of an image for transformation. For example, image 333-1 can include portion 334 of red, as such, the model 305 can tag the pixels in portion 334 for transformation.

In some examples, the model 305 can tag each of the number of images 333-1, 333-2, and 333-Z to be transformed and transmit the images 333-1, 333-2, and 333-Z including red to a program or software (e.g., Open Source Computer Vision Library (OpenCV), Vision-Something-Library (VXL), LTI, etc.) for transformation. That is, the model 305 can identify and tag images 333-1, 333-2, and 333-Z and/or portions of images 333-1, 333-2, and 333-Z for transformation and cause another device, a software, and/or a program, for example, to transform the images 333-1, 333-2, and 333-Z and/or portions of images 333-1, 333-2, and 333-Z based on tags included in the images 333-1, 333-2, and 333-Z and/or portions of images 333-1, 333-2, and 333-Z.

Figure 4:
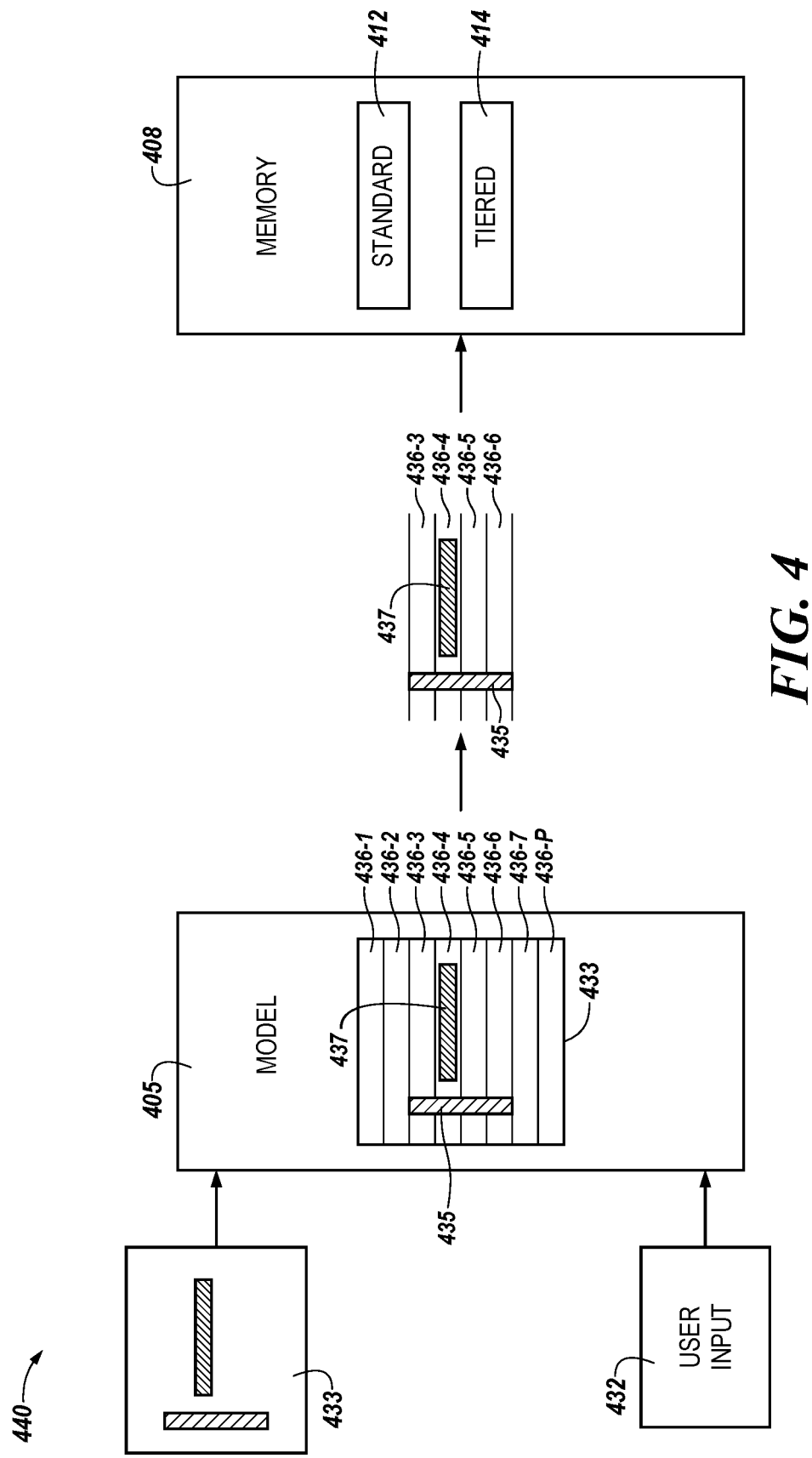
FIG. 4 is an example of a flow diagram for identifying a portion of an image to transform in accordance with a number of embodiments of the present disclosure.

FIG. 4 is an example of a flow diagram 440 for identifying a portion of an image 433 to transform in accordance with a number of embodiments of the present disclosure. Image 433 can correspond to image 233 in FIG. 2 and/or image 333 in FIG. 3. Model 405, which can correspond to model 105 in FIG. 1, model 205 in FIG. 2, and/or model 305 in FIG. 3, can receive image 433 and/or a user input 432. User input 432 can correspond to user input 332 in FIG. 3. The user input 432 can include an image, a portion of an image, a pixel color range, a type of data, a source of data, a resolution threshold, a pixel quality threshold, a contrast threshold, and/or a lighting range, for example.

In some examples, the model 405 can generate a number of settings to identify a number of portions of an image for transformation. The settings can be based on user input 432. The model 405 can receive an image 433 and identify attributes of the image 433 for transformation. For example, the model 405 can generate a color range setting and/or a color contrast setting and identify attributes within image 433 based on the setting. For instance, the color range setting can cause the model 405 to identify a portion 435 of the image 433 including blue pixels, which can be illustrated as left diagonal lines in image 433 in FIG. 4. In addition, the color contrast setting can cause the model 405 to identify a portion 437 of the image 433 including color threshold distinction attributes illustrated as right diagonal lines in image 433 in FIG. 4.

In some examples, the model 405 can divide the image 433 into a number of rows 436-1, 436-2, 436-3, 436-4, 436-5, 436-6, 436-7, and 436-P. The model 405 can scan each pixel of each row 436-1, . . . , 436-P of the image 433 to identify attributes related to the generated settings. When an attribute is identified the model 405 can tag the row of the number of rows 436-1, . . . 436-P including the attribute for transformation. For example, the model 405 can scan the rows 436-1, . . . 436-P for attributes related to a color range setting and/or a color contrast setting. The model 405 can identify and tag rows 436-3, 436-4, 436-5, and 436-6 including attributes related to a color range setting including instructions to transform blue pixels to red pixels and a color contrast setting including instructions to identify pixels that do not meet a color contrast distinction threshold. For example, model 405 can identify portion 435 including blue pixels at rows 436-3, 436-4, 436-5, and 436-6 and portion 437 including a color contrast that does not reach the threshold at row 436-4. The model 405 can tag the image 433 identifying rows 436-3, 436-4, 436-5, and 436-6 and pixels within the rows 436-3, 436-4, 436-5, and 436-6 for transformation.

In some examples, tagging an image 433 can include information, such as, the number of rows for transformation, how many pixels per row to transform, the specific pixel to be transformed, and the type of transformation for each pixel. As described herein, the model 405 can transmit the tagged image 433 and/or tagged portions 435 and/or 437 of image 433 to a device, a software, and/or a program for transformation, for example. However, this disclosure is not so limited. In some examples, the model 405 can transmit the tagged image 433 and/or tagged portions 435 and/or 437 of the tagged image 433 to a memory 408 and/or a processing resource.

Memory 408 can include standard memory 412 and/or tiered memory 414. Memory 408, standard memory 412, and tiered memory 414 can correspond to memory 108, standard memory 112, and tiered memory 114, respectively in FIG. 1. Tiered memory 414 can store content that requires more memory and processing load and standard memory 412 can store content that requires less memory and processing load.

The model 405 can determine to store data prior to transformation in standard memory 412 and/or tiered memory 414 based on the user input 432. For example, the model 405 may determine to store rows 436-3, 436-4, 436-5, and 436-6 including the one or more attributes to be transformed in the tiered memory 414 to provide more memory and processing load for performing the transformation.

In a number of embodiments, the model 405 can determine where to store the rest of the image 433 including rows 436-1, 436-2, 436-3, 436-7, and 436-P that are not being transformed. Since, rows 436-1, 436-2, 436-3, 436-7, and 436-P are not being transformed and therefore may not require more memory and/or processing load for performing the transformation, the model 405 can determine to store rows 436-1, 436-2, 436-3, 436-7, and 436-P in standard memory 412.

The model 405 can determine where to store data after it has been transformed based on the user input 432. For example, once rows 436-3, 436-4, 436-5, and 436-6 including the one or more attributes are transformed, the transformed rows can be stored with the rest of the image in standard memory 412. In some examples, the model 405 can determine where to store transformed data based on the type of transformation performed, the amount of data transformed, the type of data (e.g., type of image), whether the data will be transformed again, and/or whether an operation will be performed on the transformed data.

Figure 5:
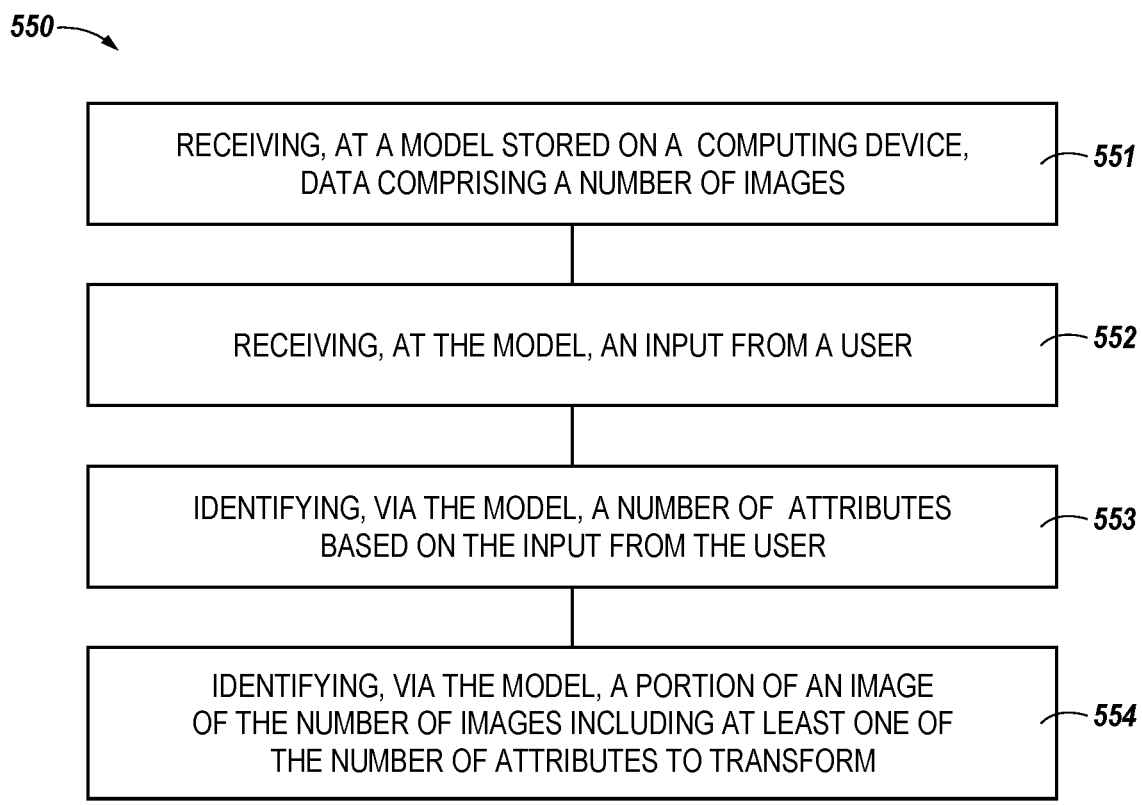
FIG. 5 is a flow diagram of a method for identifying data to transform in accordance with a number of embodiments of the present disclosure.

FIG. 5 is a flow diagram of a method 550 for identifying data to transform in accordance with a number of embodiments of the present disclosure. At block 551, the method 550 can include receiving, at a model stored on a computing device, data comprising a number of images. Images can be photographs, videos, PowerPoint slides, screen recordings, screen shots, wafer images, and/or real time videos, for example.

At block 552, the method 550 can include receiving, at the model, an input from a user. The input can be text, an attachment, and/or a selection received via a user interface. In some examples, the user can provide the model with an input to transform a first color to a second color to make an image easier to view for a person with colorblindness or other similar conditions.

At block 553, the method 550 can include identifying, via the model, a number of attributes based on the input from the user. In some examples, a particular color range can be one of the number of attributes based on the input from the user. For example, the user can input an image including the particular color, input the name of the particular color, select the particular color, draw a shape to enclose the color, and/or input a color value of the particular color.

At block 554, the method 550 can include identifying, via the model, a portion of an image of the number of images including at least one of the number of attributes to transform. In some examples, the model can tag the image and/or the portion of the image in response to identifying the portion of the image to transform. In a number of embodiments, the method 550 can include identifying, via the model, the portion of the image of the number of images in response to the portion of the image including a number of pixels in a particular color range.

The method 550 can further include transforming, via a processing resource of the computing device, the portion of the image. For example, the processing resource can transform the portion of the image by adjusting lighting of the portion of the image. In some examples, the method 550 can include transforming the portion of the image by changing a number of pixels in a particular color range to a different particular color range in response to the portion of the image including the number of pixels in the particular color range. For example, a model can identify attributes of a particular color range in an image and select the pixels in the image including the identified attributes for transformation. That is, the user can provide input to the model by selecting the particular color range for transformation and selecting the different particular color range as the transformation color. In some examples, the different particular color range can be an additional input from the user. For example, the user can select the different particular color range to transform to from the particular color range.

In a number of embodiments, the method 550 can further include identifying, via the model, a different portion of a different image of the number of images including at least one of the number of attributes to transform. The processor can transform the different portion of the different image in response to the model identifying the different portion of the different image.

In some embodiments, the method 550 can include transforming, via the processing resource, images and/or portions of images in real time. For example, the model can receive an image from an image sensor (e.g., sensor 230 in FIG. 2) during a video conference and transform portions of the image by adjusting a particular color range of the image before the image is sent to the participants of the video conference.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
a user interface configured to receive an input from a user;
a memory configured to store a model, wherein the model is configured to:
  receive data comprising a number of images generated by a first sensor of a first type of sensor and a second sensor of a second type of sensor, wherein the first type of sensor is different than the second type of sensor;
  receive the input from the user, wherein the input from the user includes at least one of: an image, a type of data, or a source of data;
  identify a number of attributes in the number of images based on the user input, wherein the number of attributes include at least one of: a blank portion or a colored portion;
  select a first image from the number of images generated by the first sensor for a first type of transformation including at least one of: a lighten transformation, a darken transformation, a resolution transformation, or a sharpen transformation based on the input from the user and the first sensor being the first type of sensor;
  identify a portion of the first image that includes the blank portion;
  tag the blank portion of the first image for transformation to horizontal lines;
  select a second image from the number of images generated by the second sensor for a second type of transformation including at least one of: the lighten transformation, the darken transformation, the resolution transformation, or the sharpen transformation based on the input from the user and the second sensor being the second type of sensor, wherein the second type of transformation is different than the first type of transformation;
  identify a portion of the second image that includes the colored portion;
  tag the colored portion of the second image for transformation to a different color;
  transmit the tagged blank portion of the first image for transformation to the horizontal lines and the tagged colored portion of the second image for transformation to the different color to a processor; and
  refrain from transmitting portions of the first image and portions of the second image that are not tagged for transformation to the processor; and
the processor configured to perform the first type of transformation on the first image, the second type of transformation on the second image, the horizontal line transformation on the tagged blank portion of the first image, and the different color transformation on the tagged colored portion of the second image.

2. The apparatus of claim 1, wherein the input from the user includes a particular color range to transform in the number of images.

3. The apparatus of claim 2, wherein the model is configured to receive additional input from the user, wherein the additional input is a selection of a different particular color range to transform to from the particular color range in the number of images.

4. The apparatus of claim 1, wherein the processor is configured to store the transformed first image and the transformed second image in the memory.

5. A method, comprising:
receiving, at a user interface, an input from a user;
storing, in memory, a model;
receiving, at the model, data comprising a number of images generated by a first sensor of a first type of sensor and a second sensor of a second type of sensor, wherein the first type of sensor is different than the second type of sensor;
receiving, at the model, the input from the user, wherein the input from the user includes at least one of: an image, a type of data, or a source of data;
identifying, by the model, a number of attributes in the number of images based on the user input, wherein the number of attributes includes at least one of: a blank portion or a colored portion;
selecting, by the model, a first image from the number of images generated by the first sensor for a first type of transformation including at least one of: a lighten transformation, a darken transformation, a resolution transformation, or a sharpen transformation based on the input from the user and the first sensor being the first type of sensor;
identifying, by the model, a portion of the first image that includes the blank portion;
tagging, by the model, the blank portion of the first image for transformation to horizontal lines;
selecting, by the model, a second image from the number of images generated by the second sensor for a second type of transformation including at least one of: the lighten transformation, the darken transformation, the resolution transformation, or the sharpen transformation based on the input from the user and the second sensor being the second type of sensor, wherein the second type of transformation is different than the first type of transformation;
identifying, by the model, a portion of the second image that includes the colored portion;
tagging, by the model, the colored portion of the second image for transformation to a different color;
transmitting the tagged blank portion of the first image for transformation to the horizontal lines and the tagged colored portion of the second image for transformation to the different color to a processor;
refraining from transmitting portions of the first image and portions of the second image that are not tagged for transformation to the processor; and
performing, at the processor, the first type of transformation on the first image, the second type of transformation on the second image, the horizontal line transformation on the tagged blank portion of the first image, and the different color transformation on the tagged colored portion of the second image.

6. The method of claim 5, further comprising storing, in the memory, the transformed first image and the transformed second image.

7. The method of claim 5, further comprising determining at least one of: a particular color range of pixels, a resolution, a pixel quality, a color contrast, or a type of image.

* * * * *